(12) United States Patent
Jones

(10) Patent No.: US 8,016,590 B2
(45) Date of Patent: Sep. 13, 2011

(54) COMBUSTION BURNER RESULTING IN LOW OXIDES OF NITROGEN

(75) Inventor: Andrew P. Jones, Owasso, OK (US)

(73) Assignee: Convergence Combustron Inc., Owasso, OK (US)

( * ) Notice: Subject to any disclaimer, the term of this patent is extended or adjusted under 35 U.S.C. 154(b) by 902 days.

(21) Appl. No.: 12/006,408

(22) Filed: Jan. 2, 2008

(65) Prior Publication Data
US 2008/0166671 A1 Jul. 10, 2008

Related U.S. Application Data

(60) Provisional application No. 60/878,606, filed on Jan. 4, 2007.

(51) Int. Cl.
*F23C 1/00* (2006.01)
(52) U.S. Cl. .................. 431/8; 431/12; 431/253; 431/9; 431/10; 431/115

(58) Field of Classification Search .................. 431/8, 9, 431/10, 12, 115, 116, 174, 181, 187, 253
See application file for complete search history.

(56) References Cited

U.S. PATENT DOCUMENTS

| | | | |
|---|---|---|---|
| 5,195,884 A | 3/1993 | Schwartz | |
| 5,730,591 A * | 3/1998 | Robertson et al. | 432/106 |
| 6,565,361 B2 | 5/2003 | Jones et al. | |

\* cited by examiner

*Primary Examiner* — Alfred Basichas
(74) *Attorney, Agent, or Firm* — Paul M. Denk

(57) ABSTRACT

A combustion burner resulting in low oxides of nitrogen includes a primary combustion zone, for use as an ignition source. The primary combustion zone locating within a combustion chamber, and being separated from the base of the combustion chamber by a wall. A burner provides a secondary oxidant stream that is delivered to the combustion chamber at the base of an exterior wall, to entrain and mix with flue gases present in the combustion chamber. Then secondary fuel is injected into the resulting secondary oxidant-flue gas mixture. Combustion of the secondary fuel with the oxidant flue gas mixture results in lower concentration of oxides of nitrogen emitted to the atmosphere.

20 Claims, 3 Drawing Sheets

COMBUSTION BURNER RESULTING IN LOW OXIDES OF NITROGEN

CROSS REFERENCE TO RELATED APPLICATION

This non-provisional application claims priority to the provisional application Ser. No. 60/878,606 filed on Jan. 4, 2007 commonly owned by the same inventor.

FIELD OF INVENTION

This invention relates generally to combustion burners and more specifically to a burner that generates low concentrations oxides of nitrogen during its functioning.

BACKGROUND OF THE INVENTION

Air quality concerns have resulted in the regulation of oxides of nitrogen from fuel burning equipment. This has given rise to a number of techniques and burner improvements to lower oxides of nitrogen emissions. Flue gas recirculation, fuel lean pre-mixing of the oxidant and fuel, fuel staging, and air staging are all techniques readily applied by those skilled in the art of combustion.

Fuel staging is a method wherein a small amount of primary fuel, or ignition gas, is used as an ignition source for a secondary fuel stream that would not otherwise combust. The secondary fuel stream can entrain flue products from the furnace resulting in lower flame temperatures and subsequently lower emissions of oxides of nitrogen.

Methods and apparatuses have also been developed wherein several of these techniques have been employed. For example, the prior art utilizes a fuel lean pre-mix in a staged manner where the lean pre-mix entrains flue gases prior to combustion and is simply ignited by ignition gas. While these methods and apparatus have achieved some success in reducing oxides of nitrogen, they have often compromised desirable attributes of burners with standard emissions of oxides of nitrogen.

For example, fuel lean pre-mix systems require higher fuel pressures to overcome the pressure exerted by the combustion air into which the fuel is injected. Furthermore, it is well established that burners that employ pre-mixture of the fuel and oxidant are more likely to acoustically couple with the combustion chamber, resulting in damaging and dangerous harmonics and pulsations.

The U.S. Pat. No. 5,195,884 to Schwartz et al. describes a low oxides of nitrogen burner. This burner has a tile 30 with a centered venture tube generally extending vertically. The tile has slanted walls upon the perimeter generally above the outlet of the venture tube. This burner operates upon a mixture of fuel gas and air sent through the venture and a secondary gas supplied upwardly upon the exterior of the slanted walls. A damper regulates air flow into the burner.

The U.S. Pat. No. 6,565,361 to Jones et al., where Jones is the applicant, shows a method for burning fuel with low formation of oxides of nitrogen. This method introduces pressurized air and primary fuel into a burner of frusto-conical shape. The walls, slanting inward, of the burner, compress the flue gases discharged from the combustion of the primary fuel. This method then introduces a secondary fuel air mixture upon the exterior of the walls of the burner at a velocity. The secondary fuel air mixture then blends with the flue gases for combustion outside of the walls of the burner.

Thus, there is a need for improvements in the methods of combustion resulting in low emissions of oxides of nitrogen.

SUMMARY OF THE INVENTION

The present invention overcomes the deficiencies of the prior art of combustion resulting in low oxides of nitrogen through new methods of combustion executed by a novel burner design. The new method has the following steps. First, a primary combustion zone is created to be utilized as an ignition source for the remaining fuel. The primary combustion zone is located within the combustion chamber and is separated from the base of the combustion chamber by an exterior wall that extends from the base of the combustion chamber into the combustion chamber adjacent to the primary combustion zone.

A secondary oxidant stream is delivered to the combustion chamber at the base of the exterior wall and flows towards the primary zone. As it flows towards the primary zone, it begins to entrain and mix with the flue gases present in the combustion chamber.

Only after this process has begun is secondary fuel injected into this flow of the secondary oxidant-flue gas mixture. The pressure within this flow field is greatly reduced compared to the discharge pressure of the oxidant because the pressure dissipates as the flue gases are entrained. Furthermore, the oxidant discharge plenum and the secondary fuel injectors are acoustically de-coupled and out of phase when acoustic perturbations are applied from the combustion chamber.

The newly formed secondary oxidant-flue gas-fuel mixture continues to entrain and mix with additional flue gases as it travels towards the primary combustion zone at a velocity sufficient to prevent combustion. As this oxidant-flue gas-fuel mixture reaches the primary combustion zone, it is ignited by the primary combustion zone, merges with the primary combustion products, and travels beyond the primary combustion zone through the combustion chamber where combustion is completed.

This novel burner includes an oxidant housing that supplies oxidant to the burner; a passageway to deliver primary oxidant to a centrally located primary combustion zone located inside of the combustion chamber from the oxidant housing; a passageway to deliver secondary oxidant to a secondary oxidant plenum whose discharge is located at the exterior base of an exterior wall that extends from the base of the combustion chamber into the combustion chamber and adjacent to the primary combustion zone; a primary fuel conduit to supply primary fuel to the primary combustion zone; a secondary conduit to supply secondary fuel to a plenum that distributes fuel to secondary fuel injectors located between the discharge location of the secondary oxidant stream and the primary burner zone and adjacent to the exterior wall.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings.

Therefore the object of the present invention is to provide a burner operating on multiple fuel streams that combust flue gases resulting in lower concentrations of oxides of nitrogen emitted.

Another object of the present invention is to optimize the combustion of fuel as to mitigate acoustic coupling of the fuel and oxidant while maintaining compact fuel geometry and low emissions of orders of nitrogen.

Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
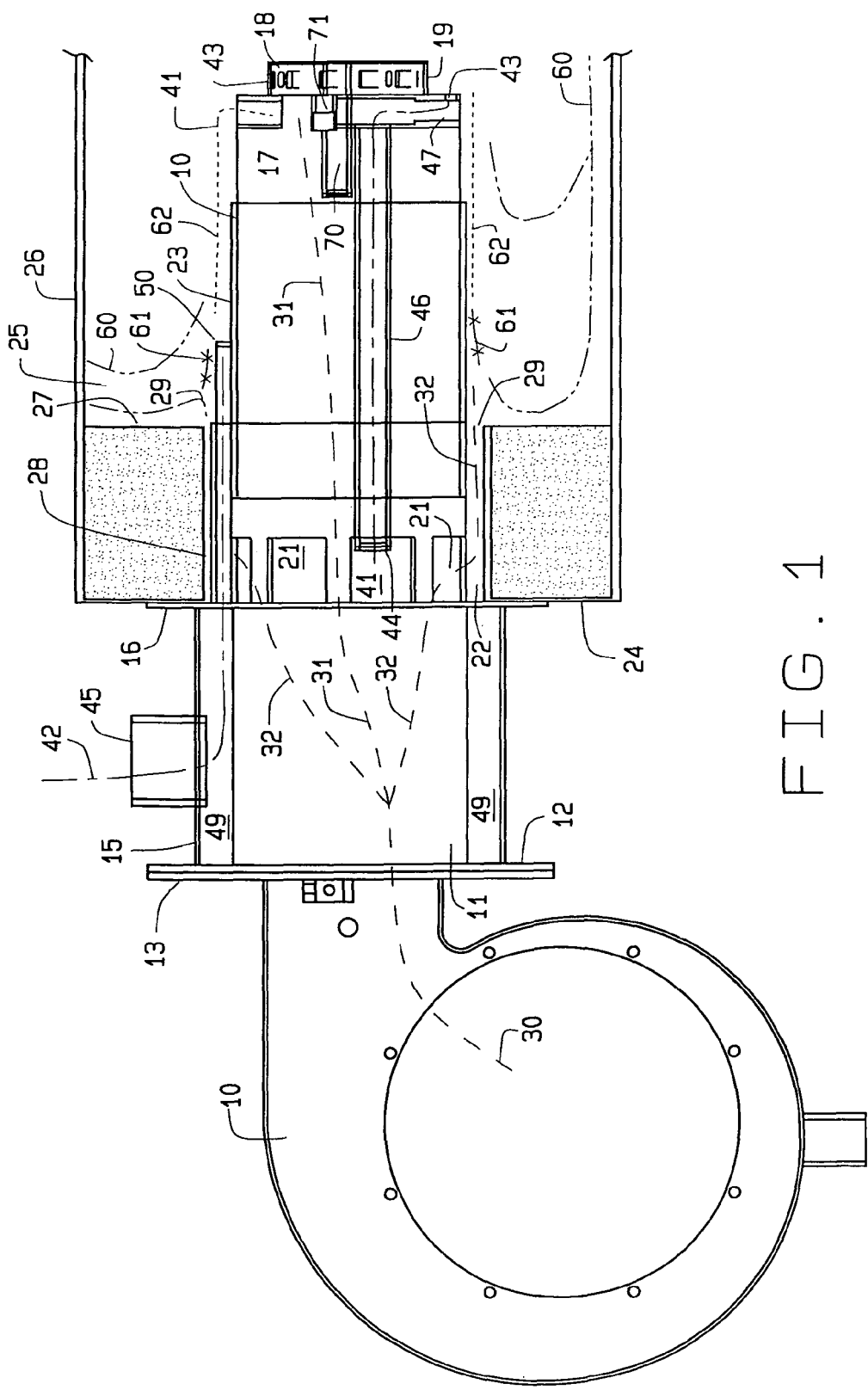
FIG. 1 is a cross-sectional view of the burner installed into a combustion chamber.
Figure 2:
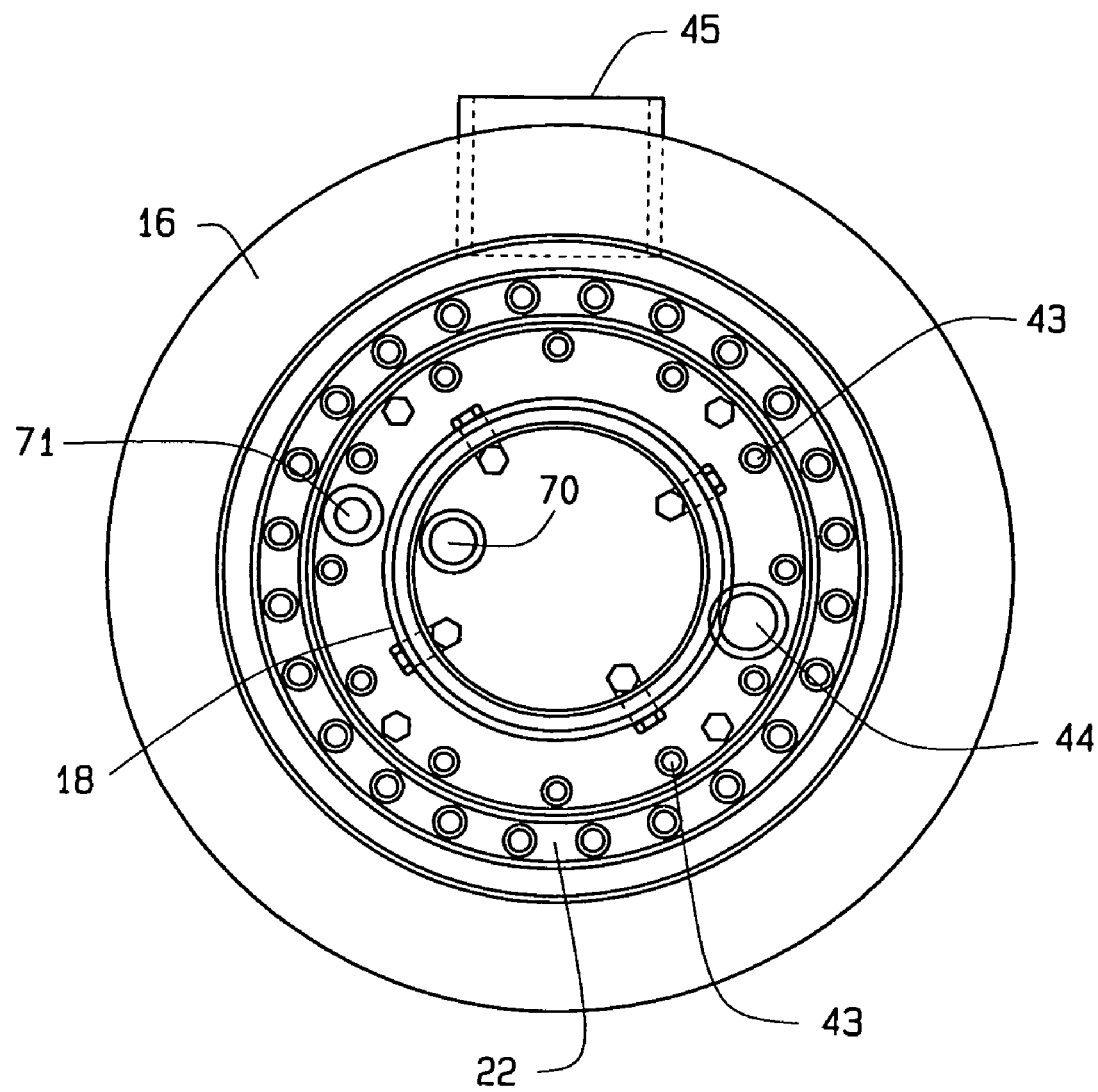
FIG. 2 is an end view of the burner apparatus.

Referring to FIGS. 1 and 2. The general burner apparatus, 15, is installed upon and into a combustion chamber 25. The combustion chamber 25 is defined by the combustion chamber wall 26, a combustion chamber base 27 with a burner opening as at 28 allowing the burner 15 to be inserted into the chamber 25. The burner 15 is attached by burner flange 16 to the mounting surface 24.

In the preferred embodiment, oxidant 30 is supplied by a combustion air fan 10, or blower, to an oxidant housing 11. The combustion air fan connects to the oxidant housing 11 at an inlet flange 12 with the outlet flange 13. The oxidant stream 30 splits into a primary oxidant stream 31 and secondary oxidant streams 32, shown above and below the primary stream 31 in this figure. The primary oxidant stream flows from oxidant housing 11 through the primary oxidant passageway 17 through the primary diffuser 18 into the primary combustion zone 19. In the preferred embodiment, the primary oxidant stream contains oxygen in the range of about 15% by volume to 100% by volume. The primary oxidant is supplied in the range of about 3% to about 35% by volume of the total oxidant discharged into the combustion chamber.

The secondary oxidant stream, shown as the upper, flows from oxidant housing 11 through secondary oxidant passageway 21 into secondary oxidant plenum 22 where it discharges into the combustion chamber adjacent to exterior wall 23 and adjacent to the combustion chamber base 27 generally described by location 29 where it mixes with flue products 60 to form the secondary oxidant-flue gas mixture 61. In the preferred embodiment, the secondary oxidant stream contains oxygen in the range of about 15% by volume to 100% by volume. Alternatively, the oxidant mixes with inert gases, re-circulated flue gases, water vapor, or steam among others.

Fuel is delivered to the burner as a primary fuel stream 41 at a primary fuel inlet 44 and secondary fuel stream 42 at secondary fuel inlet 45. Primary fuel stream 41 flows through primary fuel tube 46 to primary fuel manifold 47 through primary fuel orifice 43 into primary combustion zone 19 where it mixes with primary oxidant stream 31 to produce a primary flame. The primary fuel is supplied in the range of about 5% to about 40% by volume of the total fuel dispensed into the combustion chamber. Secondary fuel stream 42 flows through secondary fuel manifold 49 into secondary fuel injectors 50 to be injected into the combustion chamber 25 downstream from the discharge point 29 of the secondary oxidant stream, where it then mixes within the combustion chamber 25 with secondary oxidant-flue gas mixture 61, formed within the combustion chamber 25 from the discharge of the secondary oxidant stream 32 and flue gases, as previously described hereinabove, and additional flue gases 60 to form a resultant oxidant-flue gas-fuel mixture 62 which flows adjacent to exterior wall 23 to be ignited by the primary flame at primary combustion zone 19. An igniter is located at location 71 and a flame scanner views the flame at location 70. The fuels include hydrogen, hydrocarbons, or a mixture of hydrogen and hydrocarbons. Alternatively, the fuel mixes with steam, inert gases, or re-circulated flue gases, among other gases.

Figure 3:
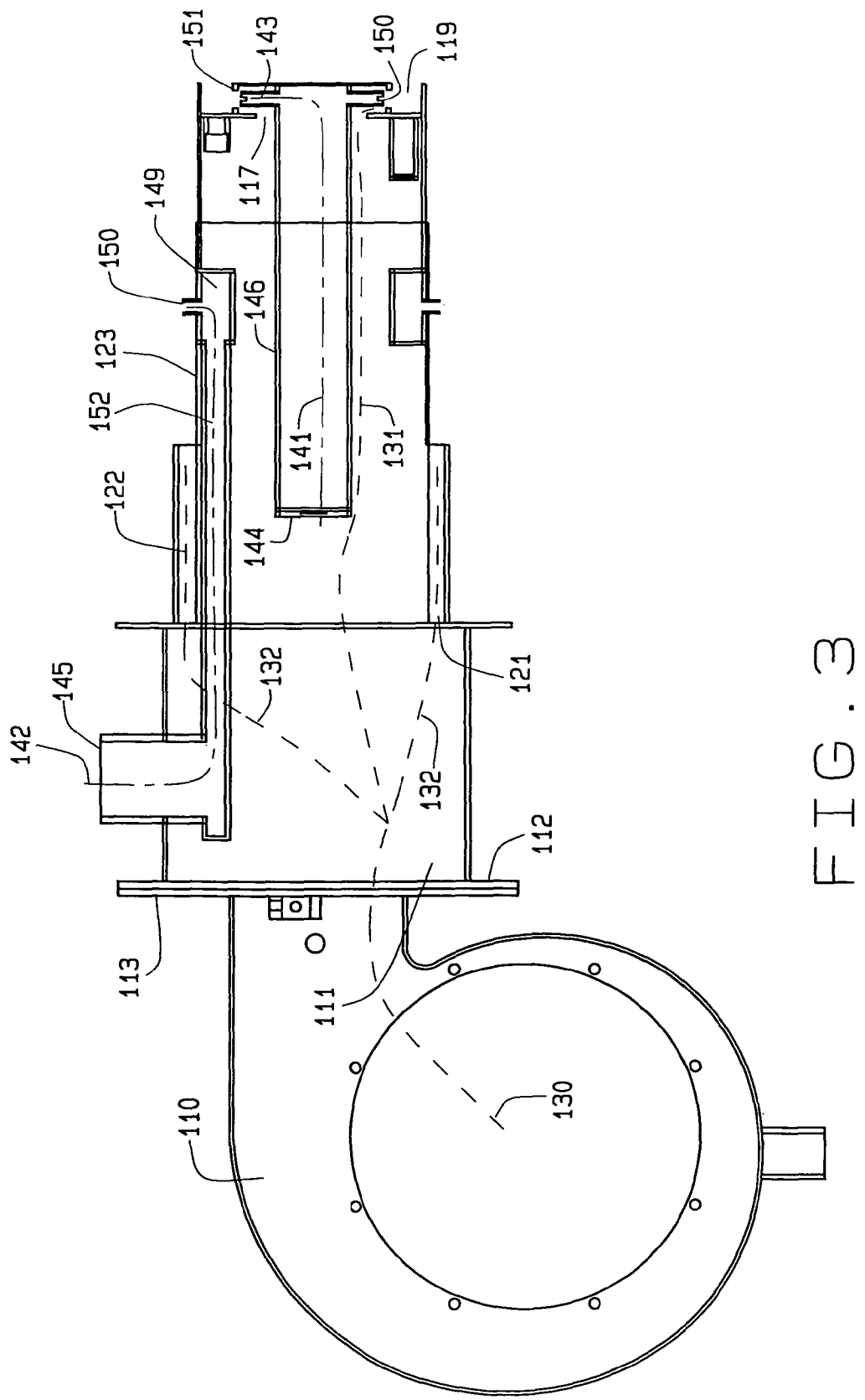
FIG. 3 is a cross-sectional view of an alternate embodiment of the burner apparatus.

Those skilled in the art may execute the described methods and devices utilizing alternate embodiments of the burner apparatus. One such alternate embodiment is described in FIG. 3. An oxidant 130 is supplied by a combustion air fan 110 to an oxidant housing 111. The combustion air fan, or blower, 110 connects to the oxidant housing 111 at an inlet flange 112 with an outlet flange 113. The oxidant stream 130 splits into the primary oxidant stream 131 and the secondary oxidant stream 132. The primary oxidant stream flows from the oxidant housing 111 through the primary oxidant passageway 117. The secondary oxidant stream flows from oxidant housing 111 through a secondary oxidant passageway 121 and then into a secondary oxidant plenum 122 where it is discharged into the combustion chamber adjacent to an exterior wall 123.

Fuel is delivered to the burner as a primary fuel stream 141 at a primary fuel inlet 144 and secondary fuel stream 142 at secondary fuel inlet 145. The primary fuel stream 141 flows through a primary fuel tube 146 and then through a primary fuel orifice 143. The primary oxidant flow 131 and the primary fuel stream 141 mix in a pre-mix chamber 150 and flow through an orifice 151 where they combust to produce a primary flame that is surrounded by an exterior wall 123. The secondary fuel stream 142 flows through a secondary fuel conduit 152 to a secondary fuel manifold 149 into secondary fuel injectors 150.

From the aforementioned description, a combustion burner resulting in low oxides of nitrogen has been described. This burner system is uniquely capable of combusting primary and secondary fuel resulting in less nitrogen oxides emitted from the burner. The burner may be manufactured from many materials, including but not limited to, ceramics, polymers, ferrous and non-ferrous metals and their alloys, and composites.

I claim:

1. An assembly emitting low oxides of nitrogen following combustion while minimizing susceptibility to aero-acoustic coupling comprising:

a combustion chamber having a base with a burner assembly extending thereinto from said base and including an exterior wall, a primary fuel stream, a primary oxidant stream, a secondary oxidant plenum, a secondary oxidant stream, a secondary fuel stream, and at least one secondary fuel injector;

said secondary oxidant stream and said secondary fuel stream maintained separate from one another and unmixed with one another within said burner assembly;

said combustion chamber having a primary combustion zone receiving a substantially stoichiometric amount of fuel and oxidant from said primary fuel stream and said primary oxidant stream, and a primary burner zone;

said exterior wall extending from said base into said combustion chamber to adjacent to said primary combustion zone;

said primary fuel stream and said oxidant stream being combusted in said primary combustion zone adjacent to said exterior wall and forming flue gases;

said secondary oxidant plenum located adjacent to said exterior wall, said secondary oxidant plenum discharging said secondary oxidant stream into said combustion chamber at a discharge point near said base, said secondary oxidant stream entraining and mixing with said flue gases in said combustion chamber thus forming a secondary oxidant-flue gas mixture flowing towards said primary burner zone;

said at least one secondary fuel injector injecting a secondary fuel stream at a discharge location downstream from said discharge point for said secondary oxidant stream and closer to said primary burner zone, said at least one secondary fuel injector located between said discharge point for said secondary oxidant stream and said primary burner zone;

said secondary fuel stream mixing with said secondary oxidant-flue gas mixture forming a resultant oxidant-flue gas-fuel mixture flowing towards said primary burner zone of at least a velocity preventing ignition of said resultant oxidant-flue gas-fuel mixture while entraining and mixing with additional flue gases in said combustion chamber; and, said resultant oxidant-flue gas-fuel mixture being combusted adjacent to said primary combustion zone, said primary fuel stream and said primary oxidant stream merging with said resultant oxidant-flue gas-fuel mixture and flowing past said primary combustion zone into said combustion chamber.

2. The low nitrogen oxide assembly of claim 1 further comprising:
said exterior wall slanting towards said primary combustion zone.

3. The low nitrogen oxide assembly of claim 1 further comprising:
said primary combustion zone having a longitudinal axis; and,
said exterior wall being substantially parallel to said longitudinal axis.

4. The low nitrogen oxide assembly of claim 1 further comprising:
said exterior wall slanting away from said primary combustion zone.

5. The low nitrogen oxide assembly of claim 1 further comprising:
said exterior wall surrounding said primary combustion zone.

6. The low nitrogen oxide assembly of claim 1 further comprising:
said exterior wall having an end opposite said burner area; and,
said primary combustion zone locating forward of said end.

7. A method of discharging a substantially stoichiometric amount of fuel and oxidant into a combustion chamber forming flue gases, said flue gases being burned, and the resulting emissions having low oxides of nitrogen, said combustion chamber including a base, comprising the steps:

(a) providing a burner assembly insertable into said combustion chamber through an opening in said base of said combustion chamber and having an exterior wall extending from said base of said combustion chamber towards a distal end with an igniter thereat and towards a primary combustion zone within said combustion chamber near said igniter and adjacent to said exterior wall;

(b) delivering to said primary combustion zone
(1) a primary oxidant stream and
(2) a primary fuel stream;

(c) combusting said primary fuel stream and said oxidant stream in said primary combustion zone;

(d) delivering separately through said burner assembly towards a primary burner zone within said combustion chamber, and without pre-mixing therebetween within said burner assembly,
(1) a secondary oxidant stream and
(2) a secondary fuel stream;

(e) discharging said secondary oxidant stream from a secondary oxidant plenum into said combustion chamber near said base of said combustion chamber at a discharge point adjacent to said exterior wall, said discharged secondary oxidant stream entraining and mixing with said flue gases in said combustion chamber to form within said combustion chamber a secondary oxidant-flue gas mixture flowing towards said primary burner zone;

(f) injecting said secondary fuel stream from at least one secondary fuel injector at a discharge location downstream from said discharge point for said secondary oxidant stream and closer to said primary burner zone, said secondary fuel injector located between said discharge point for said secondary oxidant stream and said primary burner zone;

(g) mixing within said combustion chamber said secondary fuel stream with said secondary oxidant-flue gas mixture to form a resultant oxidant-flue gas-fuel mixture flowing towards said primary burner zone of at least a velocity preventing ignition of said resultant oxidant-flue gas-fuel mixture while entraining and mixing with additional flue gases in said combustion chamber; and (h) igniting said resultant oxidant-flue gas-fuel mixture adjacent to the primary combustion zone where said primary fuel stream and said primary oxidant stream merge with said resultant oxidant-flue gas-fuel mixture and flow past said primary combustion zone into said combustion chamber;

whereby said lack of pre-mixing of said fuel and oxidant streams within said burner assembly minimizes susceptibility to aero-acoustic coupling and damage resulting therefrom.

8. The method of claim 7 wherein said exterior wall is slanted towards the primary combustion zone.

9. The method of claim 7 wherein said exterior wall is substantially parallel to the central axis of the primary combustion zone.

10. The method of claim 7 wherein said exterior wall is slanted away from the primary combustion zone.

11. The method of claim 7 wherein said exterior wall surrounds the primary combustion zone.

12. The method of claim 7 further comprising said exterior wall having an end opposite said base and said primary combustion zone locating forward of said end of the exterior wall.

13. The method of claim 7 wherein said oxidant contains oxygen in the range of about 15% by volume to 100% by volume.

14. The method of claim 7 wherein said fuel is one of hydrogen, hydrocarbons, or a mixture of hydrogen and hydrocarbons.

15. The method of claim 7 wherein said fuel is mixed with one of inert gases, re-circulated flue gases, or steam.

16. The method of claim 7 wherein said oxidant is mixed with one of re-circulated flue gases, steam or water vapor.

17. The method of claim 7 wherein said oxidant is supplied by a combustion air blower.

18. The method of claim 7 wherein said primary fuel includes about 5% to about 40% by volume of fuel discharged into said combustion chamber.

19. The method of claim 7 wherein said primary oxidant includes about 3% to about 35% by volume of oxidant discharged into said combustion chamber.

20. The method of claim 7 wherein said primary oxidant stream and said primary fuel stream are delivered separately through said burner assembly, and without pre-mixing therebetween within said burner assembly, to said primary combustion zone.

* * * * *

UNITED STATES PATENT AND TRADEMARK OFFICE
CERTIFICATE OF CORRECTION

| | | |
|---|---|---|
| PATENT NO. | : 8,016,590 B2 | Page 1 of 1 |
| APPLICATION NO. | : 12/006408 | |
| DATED | : September 13, 2011 | |
| INVENTOR(S) | : Andrew P. Jones | |

It is certified that error appears in the above-identified patent and that said Letters Patent is hereby corrected as shown below:

Title Page;

Please change the Certificate as follows:

Column 1, line (73) Assignee: should be --Combustion--, instead of "Combustron".

Signed and Sealed this
Twenty-second Day of November, 2011

David J. Kappos
*Director of the United States Patent and Trademark Office*